(12) United States Patent
Marra

(10) Patent No.: US 8,452,489 B2
(45) Date of Patent: May 28, 2013

(54) CONTROLLING SYSTEM FOR CONTROLLING AN AIR HANDLING SYSTEM

(75) Inventor: Johan Marra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 772 days.

(21) Appl. No.: 12/521,879

(22) PCT Filed: Jan. 8, 2008

(86) PCT No.: PCT/IB2008/050037
§ 371 (c)(1),
(2), (4) Date: Jul. 1, 2009

(87) PCT Pub. No.: WO2008/084432
PCT Pub. Date: Jul. 17, 2008

(65) Prior Publication Data
US 2009/0312905 A1    Dec. 17, 2009

(30) Foreign Application Priority Data
Jan. 10, 2007  (EP) ..................................... 07100335

(51) Int. Cl.
*B60H 1/00*   (2006.01)
*B61D 27/00*   (2006.01)
(52) U.S. Cl.
USPC ................. 701/36; 700/276; 96/16; 73/28.02
(58) Field of Classification Search
USPC .................... 701/36; 700/276, 278; 73/28.02, 73/28.01; 96/15–16; 356/51; 165/41, 42, 165/202, 210, 211, 213, 248, 303; 296/190.09; D23/324, 325, 351, 355, 364
See application file for complete search history.

(56) References Cited

U.S. PATENT DOCUMENTS 4,352,321 A * 10/1982 Fukui et al. ..................... 454/75
5,725,425 A * 3/1998 Rump et al. .................... 454/75
(Continued)

FOREIGN PATENT DOCUMENTS

EP  0042287 A1  12/1981
FR  2691677 A1  12/1993
(Continued)

*Primary Examiner* — Thomas Black
*Assistant Examiner* — Ce Li
(74) *Attorney, Agent, or Firm* — Larry Liberchuk

(57) ABSTRACT

The invention relates to a controlling system for controlling an air handling system that is arranged to handle air in an enclosure such as a cabin of a vehicle. The controlling system comprises a first sensing unit, a second sensing unit, and a controller. The first sensing unit is arranged to generate a first output signal based on a measurement of the 5 concentration of certain airborne pollutants at the upstream side of an air cleaning unit that is comprised in the air handling system. The second sensing unit is arranged to generate a second output signal based on a measurement of the concentration of certain airborne pollutants at the downstream side of the air cleaning unit. The first output signal and the second output signal are used for specific purposes in a decision-making process that can be 10 performed by the controller. The controller is arranged to switch the air handling system into recirculation mode when the first output signal exceeds a predetermined threshold value. Furthermore, the controller is arranged to fine-tune settings of the air handling system, such as the mixing ratio of air admitted from outside the enclosure and recirculating air from the enclosure in the total air flow passing through the air handling system when the air handling 15 system operates in an outside-air-inlet mode. The controlling system according to the invent ion has an increased functionality and can maintain an acceptable air quality inside an enclosed space under a large variety of circumstances.

9 Claims, 3 Drawing Sheets

U.S. PATENT DOCUMENTS

| | | |
|---|---|---|
| 6,229,439 B1 | 5/2001 | Tice |
| 6,392,536 B1 | 5/2002 | Tice et al. |
| 6,800,022 B2 | 10/2004 | Urbank et al. |
| 6,897,774 B2 | 5/2005 | Costa et al. |
| 7,068,177 B2 | 6/2006 | Tice |
| 2008/0041138 A1* | 2/2008 | Marra .......................... 73/31.02 |
| 2008/0092742 A1* | 4/2008 | Marra .............................. 96/16 |
| 2010/0043527 A1* | 2/2010 | Marra .......................... 73/28.02 |

FOREIGN PATENT DOCUMENTS

| | | |
|---|---|---|
| WO | 8906608 A1 | 7/1989 |
| WO | 2006016345 A1 | 2/2006 |
| WO | 2006016346 A1 | 2/2006 |
| WO | 2007000710 A2 | 1/2007 |

* cited by examiner

CONTROLLING SYSTEM FOR CONTROLLING AN AIR HANDLING SYSTEM

FIELD OF THE INVENTION

The invention relates to a controlling system for controlling an air handling system, the air handling system comprising an air cleaning unit having an upstream side and a downstream side, the air cleaning unit being arranged to pass an air flow into an enclosure positioned at the downstream side of the air cleaning unit, the air handling system being arranged to operate in recirculation mode or in an outside-air-inlet mode, the controlling system comprising a first sensing unit and a controller, the first sensing unit being arranged to generate a first output signal based on a first measurement performed in air at the upstream side of the air cleaning unit, the controller being arranged to switch the air handling system into recirculation mode when the first output signal exceeds a predetermined threshold value.

The invention also relates to a vehicle comprising a cabin and the controlling system, wherein the enclosure is the cabin.

BACKGROUND OF THE INVENTION

To safeguard human health it is important to prevent health-hazardous airborne pollutants from being inhaled. A first example of health-hazardous airborne pollutants are noxious gases, such as carbon monoxide (CO), nitrogen oxide ($N_xO_y$), volatile organic compounds, sulphur dioxide ($SO_2$), and ozone ($O_3$). A second example of a health-hazardous airborne pollutant is inhalable particulate matter. Such inhalable particulate matter comprises fine particles (particles with an equivalent diameter between about 2.5 µm and 10 µm), and ultrafine particles (particles with an equivalent diameter between about 10 nm and about 2.5 µm). Ultrafine particles are particularly health-hazardous as they tend to deposit on, and eventually encapsulate in lung tissue.

Health-hazardous airborne pollutants originate particularly from combustion sources. Apart from the neighborhood of industrial combustion sources and other stationary combustion sources, the concentration of combustion-related health-hazardous airborne pollutants is high on or near locations where motorized traffic is present. Very high local concentrations may be encountered particularly in tunnels, at or near traffic intersections and/or in or near traffic queues under conditions of limited ventilation and/or limited wind speed. A high concentration of health-hazardous airborne pollutants may also be encountered in an enclosed space such as a room in a building or in a home, or in a cabin of a vehicle. Especially automobile drivers and passengers become readily exposed to elevated concentrations of health-hazardous airborne pollutants when outside air that is polluted by exhaust gases and/or particles is admitted into the automobile cabin. This may occur when the air handling system of the automobile operates in an outside-air-inlet mode, in which air is allowed to enter the cabin from the outside of the vehicle. It is therefore desirable to automatically switch the air handling system from an outside-air-inlet mode into recirculation mode, in response to conditions pertaining to the air outside the automobile. In recirculation mode, the intake of outside air is halted and only cabin air is recirculated through the air handling system.

A sensor system for controlling a ventilation system in a vehicle is known from U.S. Pat. No. 5,725,425. The ventilation system is arranged to operate in a recirculation mode or in an air input mode. The sensor system comprises a gas sensor element and an evaluation unit. The gas sensor element is arranged to generate an output signal based on the concentration of certain noxious gases in the air outside the vehicle. The evaluation unit is arranged to generate a signal to switch the ventilation system into the recirculation mode as soon as the rate of change of the output signal of the gas sensor element exceeds a predetermined limit. In other words, the presence of the gas sensor element in the known sensor system enables the ventilation system to be switched from an air input mode into the recirculation mode in response to conditions pertaining to the air outside the vehicle, thereby preventing health-hazardous airborne gaseous pollutants from entering the vehicle's cabin from the outside via the ventilation system.

However, as in the recirculation mode no air is allowed to enter the vehicle's cabin from the outside via the air handling system, the air quality and comfort level inside the cabin quickly deteriorate due to, for instance, the production of moisture, carbon dioxide, and/or cigarette smoke by a passenger, or the release of scents by a material in the interior of the cabin. In order to minimize the pollution level inside the cabin while maintaining safe and comfortable cabin air conditions, it is therefore also desirable to be able to automatically switch the air handling system very quickly if not immediately from recirculation mode to an outside-air-inlet mode in which, at least to some extent, air is allowed to enter the cabin from the outside. In such an outside-air-inlet mode, the air entering the cabin via the air handling system is partly composed of recirculating air and partly of outside air with an adjustable mixing ratio. In this context, an optimized mixing ratio is the outcome of a judicious compromise between adequate ventilation of the cabin with outside air, in order to rapidly remove, for instance, excess moisture, carbon dioxide, odours, cigarette smoke, etc. from the cabin, and the minimization of airborne pollutants entering the cabin from the outside via the air handling system.

In the known sensor system, the decision to switch the ventilation system between recirculation mode and outside-air-inlet mode is based on the output signal of the gas sensor element, and supported by an electronic neural network, or an electronic fuzzy logic unit.

The known sensor system has a limited functionality as it is not able to optimize the mixing ratio between recirculating air and outside air in the air flow entering the cabin via the ventilation system. Consequently, the known sensor system is not able to maintain an acceptable air quality inside an enclosed space under a large variety of circumstances.

SUMMARY OF THE INVENTION

It is an object of the invention to provide a controlling system of the kind set forth in the opening paragraph which has an increased functionality.

According to the invention this object is realized in that the controlling system further comprises a second sensing unit that is arranged to generate a second output signal based on a second measurement performed in air at the downstream side of the air cleaning unit, the controller being further arranged to fine-tune settings of the air handling system based on the second output signal.

It was realized by the inventor that the limited functionality of the known sensor system originates to a large extent from a limited functionality of the supporting means comprised in the known sensor system. Furthermore, the known sensor system is only capable of measuring in the outside air entering the air handling unit but is incapable of measuring in the cabin air or in the air entering the cabin via the air handling unit. In order to increase the functionality, a second sensing unit is added to the controlling system. Furthermore, the first and second sensing units are arranged to measure in air at the upstream side and at the downstream side of the air cleaning unit, respectively, while the output signal of each sensing unit is used for a specific purpose only. In the controlling system of the invention, the output signal of the first sensing unit (i.e. the first output signal) is used to decide about a switch of the air handling unit from an outside-air-inlet mode to the recirculation mode, wherein the switch preferably follows the occurrence of a health-hazardous air pollution level at the upstream side of the air cleaning unit as soon as possible. The output signal of the second sensing unit (i.e. the second output signal) is used to fine-tune settings of the air handling system, in particular the settings that control the volume of an air flow entering the enclosure via the air handling system, and the mixing ratio between recirculating air and outside air in the air flow when the air handling system operates in an outside-air-inlet mode.

The purpose of fine-tuning settings of the air handling system is twofold. Firstly, the enclosure should be supplied with a maximum amount of outside ventilation air at the required total air flow. Secondly, the entry of pollutants from outside into the enclosure should be minimized. This will generally impose an upper limit on the amount of outside air that is allowed to enter the enclosure via the air handling system. Optimized settings of the air handling system result from a judicious compromise between the aforementioned wishes.

Such an arrangement of sensing units and specific allocation of tasks increases the functionality of the controlling system regarding the decision to switch the air handling system into a certain operational mode. Consequently, the controlling system according to the invention is able to maintain an acceptable air quality inside an enclosed space under a large variety of circumstances.

An embodiment of the controlling system of the invention is defined in claim 2. In this embodiment the second sensing unit is arranged to perform the second measurement inside the air handling system. This embodiment increases the reliability of the controlling system. By checking the first output signal and the second output signal on their mutual consistency and compatibility, early fault diagnosis may be obtained, resulting in an increased reliability of actions performed by the controller based on the first output signal and/or the second output signal.

An embodiment of the controlling system of the invention is defined in claim 3. In this embodiment the air cleaning unit is arranged to at least partly remove from the air flow a pollutant for which the second sensing unit is responsive. Consequently, the second output signal is affected by the performance of the air cleaning unit. By monitoring the second output signal relative to the first output signal, the air cleaning performance of the air handling system can be checked, thereby obtaining a further increase in the reliability of the controlling system.

An embodiment of the controlling system of the invention is defined in claim 4. In this embodiment the second sensing unit is arranged to perform the second measurement inside the enclosure. This embodiment further increases the functionality by enabling the air handling system to respond to a presence inside the enclosure of airborne pollutants that have either entered the enclosure from the outside but not via the air handling unit itself (for instance, via an open window), or that originate from a pollution source inside the enclosure (such as a person smoking a cigarette). A direct measurement of airborne pollutants inside the enclosure is desirable because it is the air inside the enclosure that is actually being inhaled by people residing inside the enclosure and which can thus affect their health and well-being.

An embodiment of the controlling system of the invention is defined in claim 5. In this embodiment the first sensing unit comprises a gas sensor. This embodiment further increases the functionality as the gas sensor has a very short response time thereby enabling the air handling system to be switched into recirculation mode immediately when a high concentration of health-hazardous gaseous airborne pollutants in the outside air reaches the air inlet of the air handling system, thereby largely preventing entry of the health-hazardous gaseous airborne pollutants into the enclosure.

An embodiment of the controlling system of the invention is defined in claim 6. In this embodiment the second sensing unit comprises a particle sensor. This embodiment further increases the functionality as the particle sensor is able to determine the absolute concentration of airborne particles in the air flow passing through the air handling system and/or in the air inside the enclosure.

An embodiment of the controlling system of the invention is defined in claim 7. In this embodiment the air cleaning unit comprises a particle filter, and the particle sensor is an ultrafine particle sensor. This embodiment further increases the functionality as the combination of the particle filter and the ultrafine particle sensor offers improved protection inside the enclosure against exposure to airborne ultrafine particles, which are particularly health-hazardous.

These and other aspects of the controlling system and the vehicle according to the invention will be apparent from and elucidated with reference to the embodiments described hereinafter.

BRIEF DESCRIPTION OF THE DRAWINGS

Examples of the controlling system and the vehicle according to the invention will now be described in detail with reference to the accompanying drawings, in which.

Figure 1:
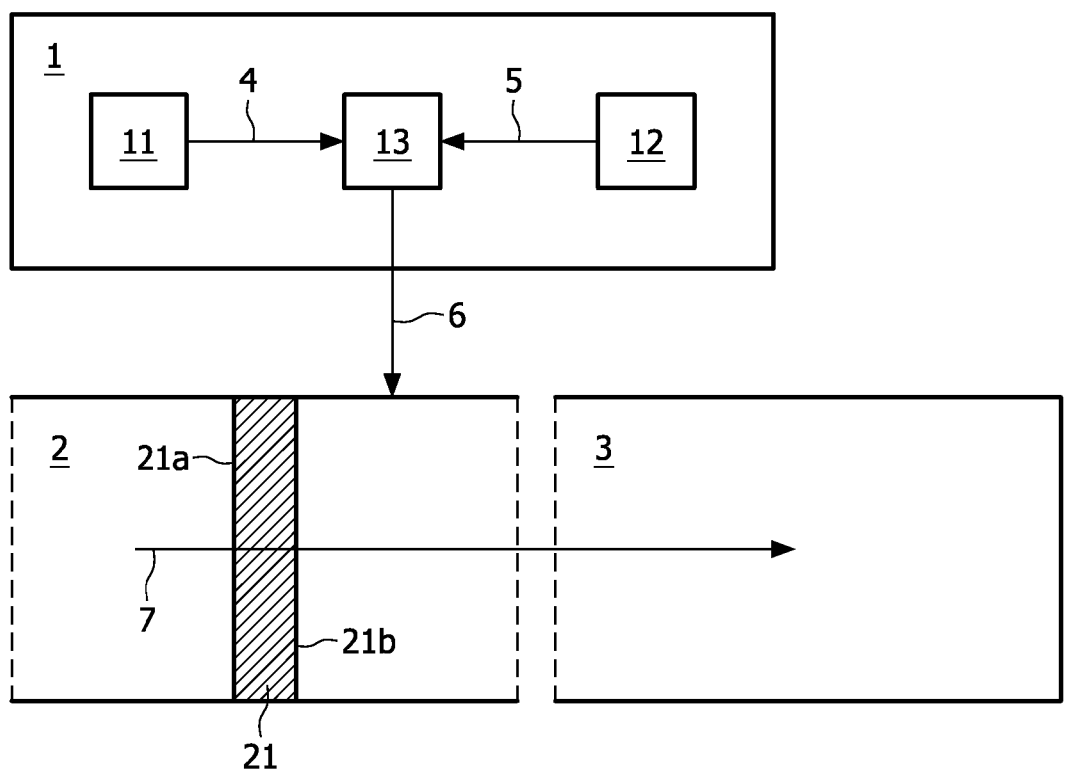
FIG. 1 is a schematic representation of the controlling system according to the invention.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION OF THE EMBODIMENTS

The controlling system 1 of FIG. 1 comprises a first sensing unit 11, a second sensing unit 12, and a controller 13. The first sensing unit 11 generates a first output signal 4 based on a first measurement in air. The second sensing unit 12 generates a second output signal 5 based on a second measurement in air. The first output signal 4 and the second output signal 5 are used by the controller 13 in a decision-making process to generate a controlling signal 6 that is used to control the operation and settings of an air handling system 2.

The air handling system 2 is arranged to control the air quality inside an enclosure 3. The air handling system 2 comprises an air cleaning unit 21 having an upstream side 21a, and a downstream side 21b. Next to the air cleaning unit 21, the air handling system 2 may comprise additional components, such as a blower unit, a damper unit, a heating unit, a cooling unit, a humidifying unit, or a combination thereof (not shown in FIG. 1). The air handling system 2 may be a part of a heating, ventilating, and air conditioning (HVAC) system.

The air cleaning unit 21 comprises a filter for at least partly removing particles from the air flow 7. Examples of such airborne particles are dust particles, soot particles, and inorganic ash particles. Such a filter may be a pleated medium filter, a high efficiency particulate air (HEPA) filter, an electrostatic filter, or a combination thereof. Alternatively, the air cleaning unit 21 may be any unit that is capable of removing pollutants from the air flow 7. Next to airborne particles, other examples of airborne pollutants are noxious gases, such as carbon monoxide (CO), nitrogen oxides ($N_xO_y$) volatile organic compounds, sulphur dioxide ($SO_2$), and ozone ($O_3$). These may be removed from air by means of activated carbon filters, certain types of catalytic filters, chemically-impregnated absorption filters, or combinations thereof.

In FIG. 1, an air flow 7 is passing through the air cleaning unit 21, into the enclosure 3 that is positioned at the downstream side 21b of the air cleaning unit 21. Usually, the air handling system 2 is connected to the enclosure 3 via ductwork (not shown in FIG. 1). The enclosure 3 can for instance be a room in a building, or a cabin of a vehicle. Entrance of air into the enclosure 3 can also occur in other ways than through the air handling system 2. For instance, if the enclosure 3 is a room or a cabin, air can also enter the enclosure 3 via an open window.

The air handling system 2 is arranged to operate in recirculation mode or in an outside-air-inlet mode. In recirculation mode, air from the enclosure 3 is recirculated through the air handling system 2, and no outside air is allowed to enter the enclosure 3 via the air handling system 2. In an outside-air-inlet mode, outside air is allowed to enter the enclosure 3 via the air handling system 2, to a certain extent. The outside-air-inlet mode is generally a mixed mode as it includes both supply of outside air and recirculation of air from the enclosure 3, with an adjustable mixing ratio that is determined by settings of the air handling system 2.

Since recirculating air passes the air cleaning unit 21 more than once, the amount of airborne particles (and possibly other pollutants as well) in recirculating air will generally be smaller than in outside air that has passed the air cleaning unit 21 only once, at least when the air cleaning unit 21 has a certain capability of removing airborne particles from the air flow 7, and when no particle pollution source is present inside the enclosure 3. As such, the amount of airborne particles entering the enclosure 3 becomes a function of the mixing ratio between the outside air and the recirculating air in the air flow 7 and can thus be tuned via the settings of the air handling system 2. A relatively increasing amount of recirculating air in the air flow 7 reduces the concentration of airborne particle in the air flow 7, in particular the concentration of airborne particles that originate from outside the enclosure 3. At the same time, the concentration of airborne pollutants that are generated inside the enclosure 3, such as for instance carbon dioxide, moisture, volatile organic compounds and odours, increases, at least when these airborne pollutants are not removed from the air flow 7 by the air cleaning unit 21. By means of dilution, a relatively increasing amount of outside air in the air flow 7 reduces the concentration in the air flow 7 of airborne pollutants that originate from inside the enclosure 3. A judicious control of the settings of the air handling system 2 that determine both the overall volume of the air flow 7 and the mixing ratio between recirculating air and outside air of the air flow 7 can minimize both the entry of airborne pollutants from outside into the enclosure 3 and the built-up of airborne pollutants that are generated inside the enclosure 3, while retaining comfortable ambient conditions inside the enclosure 3.

The first output signal 4 and the second output signal 5 are used as complementary parameters in a decision-making process that is performed by the controller 13. The second output signal 5 is used to fine-tune settings of the air handling system in an outside-air-inlet mode. An example of such a setting is the ratio between recirculation of air and supply of outside air. Another example of such a setting is the setting that controls the volume of the air flow 7 entering the enclosure 3 per unit of time via the air handling system 2, such as the speed of a fan.

The first output signal 4 is used in the decision-making process when it exceeds a predetermined threshold value, in which case the outcome of the decision-making process is to immediately switch the air handling system into recirculation mode. In other words, the decision to admit outside air into the enclosure 3 is predominantly based on the second output signal 5, in response to inside air pollution levels, while the first output signal 4 serves basically as a switch signal to switch the air handling system 2 into recirculation mode in response to suddenly increasing outside air pollution levels. By such a selective use of the first output signal 4 and the second output signal 5, the controller 13 is enabled to rapidly adjust the settings of the air handling system 2 such as to minimize the exposure of people inside the enclosure 3 to airborne pollutants while supplying the enclosure 3 with at least a minimum amount of outside ventilation air and maintaining comfortable and safe ambient conditions such as temperature, humidity and carbon dioxide levels inside the enclosure 3.

The controller 13 may optionally comprise means to support the decision-making process, such as an electronic neural network and/or an electronic fuzzy logic unit. Furthermore, the controller 13 may optionally receive output signals from other sensor units as well, for example from a temperature sensing unit, and/or from a humidity sensing unit and/or from a carbon dioxide sensing unit.

Figure 2A:
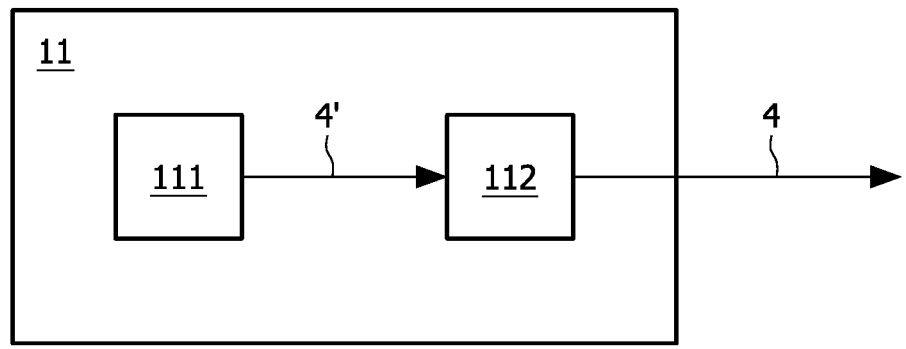
FIG. 2A-2B are schematic representations of the first sensing unit and the second sensing unit, respectively.

The first sensing unit 11 of FIG. 2A comprises a first sensor 111 and a first data evaluation unit 112. The first sensor 111 is a gas sensor that is arranged to generate an output signal 4' based on the rate of change of the concentration of certain gases in air. Alternatively, the first sensor 111 may be any sensor that is arranged to generate an output signal based on the concentration of certain airborne pollutants. The output signal 4' is processed by the first data evaluation unit 112, which in turn generates the first output signal 4 based on the output signal 4'. The gas sensor is arranged to rapidly respond to changes in the outside air gaseous pollution level. Consequently, via the controller 13 the air handling system 2 can be switched immediately into recirculation mode in response to a rapid deterioration in the outside air quality, thereby largely preventing the outside air pollutants to enter the enclosure 3.

Figure 2B:
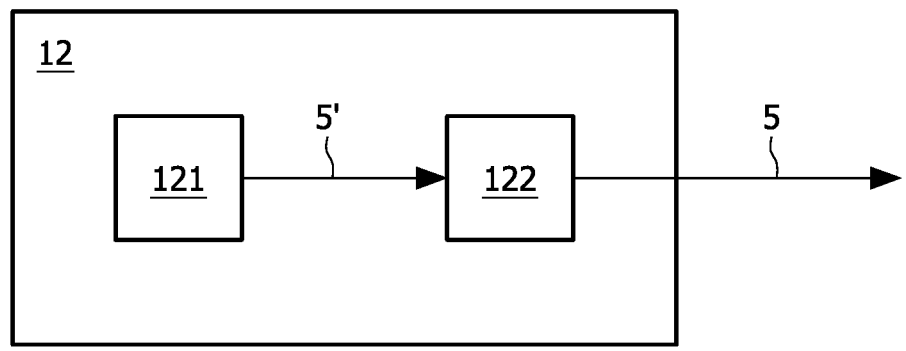

The second sensing unit 12 of FIG. 2B comprises a second sensor 121 and a second data evaluation unit 122. The second sensor 121 is a particle sensor that is arranged to generate an output signal 5' based on the absolute concentration of certain airborne particles. Alternatively, the second sensor 121 may be any sensor that is arranged to generate an output signal based on the concentration of certain airborne pollutants. The output signal 5' is processed by the second data evaluation unit 122, which in turn generates the second output signal 5 based on the output signal 5'.

In a particular embodiment, the second sensor 121 is an ultrafine particle sensor. An ultrafine particle sensor is suitable for assessing the absolute concentration of ultrafine particles in air. In the context of this invention, an ultrafine particle is a particle with an equivalent diameter between about 10 nm and about 2.5 µm. Examples of ultrafine particle sensors are described in WO 2006/016346 A1 and WO 2006/016345 A1.

Figure 3:
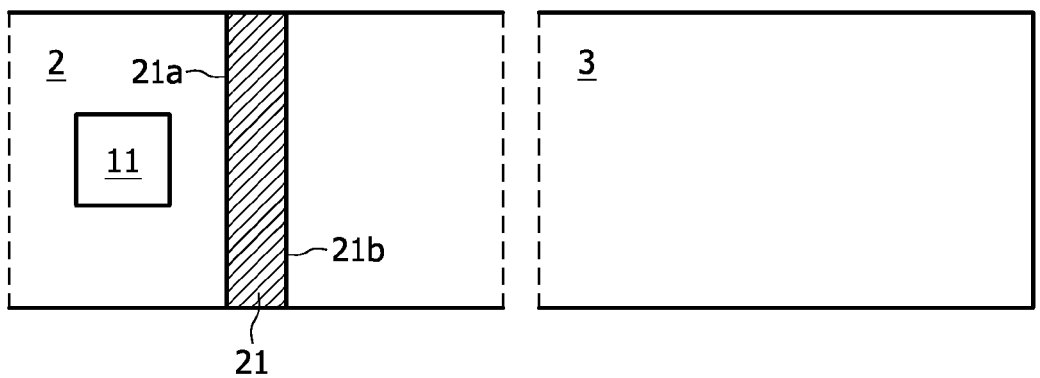
FIG. 3 illustrates the measurement position of the first sensing unit.

As shown in FIG. 3, the first sensing unit 11 is arranged to perform the first measurement in air at the upstream side 21a of the air cleaning unit 21. Although in FIG. 3, the complete first sensing unit 11 is shown to be present inside the air handling system 2, one can also have only the first sensor 111 present inside the air handling system 2, or have the complete first sensing unit 11 outside the air handling system 2, for example in or near the outside air inlet of the air handling system 2, as long as the air that is measured by the first sensing unit 11 is present at the upstream side 21a of the air cleaning unit 21.

Figure 4A:
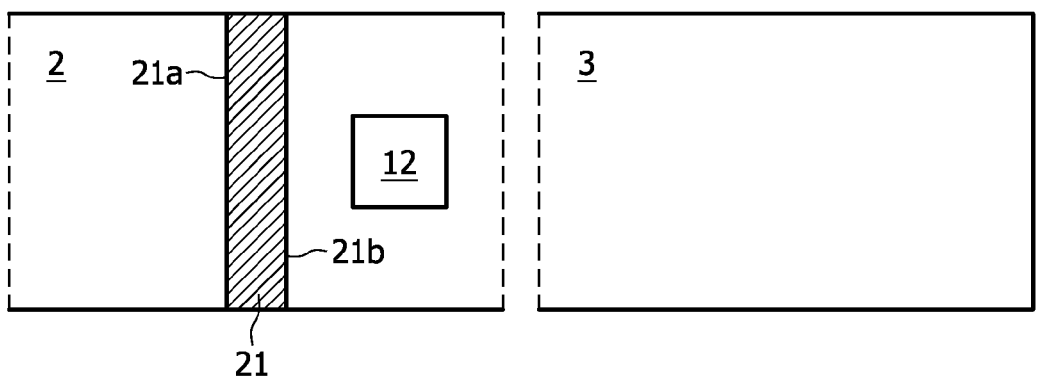
FIG. 4A-4B illustrate the measurement position of the second sensing unit in a first and second embodiment, respectively.

As shown in FIG. 4, the second sensing unit 12 is arranged to perform the second measurement in air at the downstream side 21a of the air cleaning unit 21. In a first embodiment, shown FIG. 4A, the second sensing unit 12 is arranged to perform the second measurement inside the air handling system 2. Although in FIG. 4A, the complete second sensing unit 12 is shown to be present inside the air handling system 2, this embodiment is not restricted to such an arrangement. One can also have only the second sensor 121 present inside the air handling system 2, or one can have the complete second sensing unit 12 outside the air handling system 2 and use means to duct air from the part of the air handling system 2 at the downstream side 21b of the air cleaning unit 21, to the second sensing unit 12. In this embodiment, the first output signal 4 and the second output signal 5 can be checked on their mutual consistency and compatibility, thereby obtaining early fault diagnosis and an increased reliability of the decision-making process. This embodiment is particularly useful when no air pollution source is present inside the enclosure 3. This embodiment is also useful to check upon the functionality of the air cleaning unit 21 in case the air cleaning unit 21 is capable of at least partly removing those pollutant species from air that also induce a response from the second sensing unit 12.

Figure 4B:
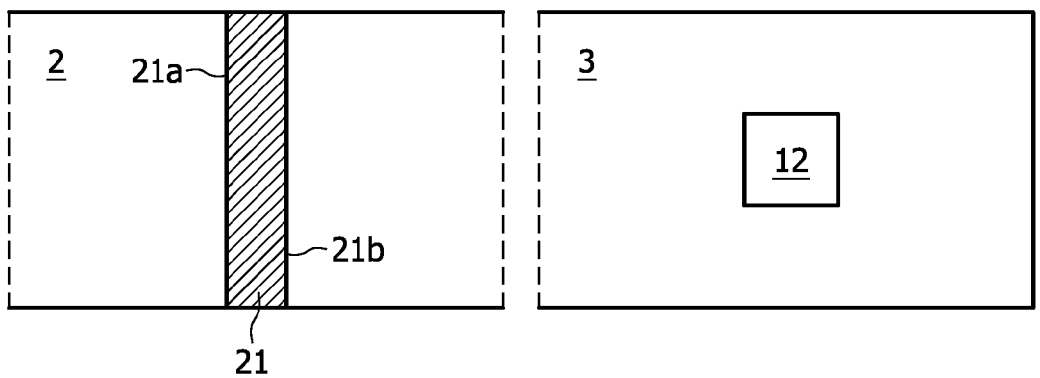

In a second embodiment, shown in FIG. 4B, the second sensing unit 12 is arranged to perform the second measurement inside the enclosure 3. This embodiment is particularly useful when an air pollution source is present inside the enclosure 3. In this case the second output signal 5 does not necessarily correlate with the first output signal 4, and the air handling system 2 can be switched into an outside-air-inlet mode when the second sensing unit 12 signals the existence of a high concentration of certain airborne pollutants that have not entered the enclosure 3 via the air handling system 2.

While the invention has been illustrated and described in detail in the drawings and foregoing description, such illustration and description are to be considered illustrative or exemplary and not restrictive; the invention is not limited to the disclosed embodiments. Variations to the disclosed embodiments can be understood and effected by those skilled in the art in practicing the claimed invention, from a study of the drawings, the disclosure, and the appended claims. In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A controlling system for controlling an air handling system, the air handling system comprises an air cleaning unit having an upstream side and a downstream side, the air cleaning unit being arranged to pass an air flow into an enclosure positioned at the downstream side of the air cleaning unit, the air handling system being arranged to operate in recirculation mode or in an outside-air-inlet mode, the controlling system comprising:
   a first sensing unit arranged to generate a first output signal based on a first measurement performed in air at the upstream side of the air cleaning unit;
   a controller arranged to switch the air handling system into recirculation mode when the first output signal exceeds a predetermined threshold value; and
   a second sensing unit arranged to generate a second output signal based on a second measurement performed in air at the downstream side of the air cleaning unit, wherein the controller is further arranged to fine-tune settings of the air handling system based on the second output signal.

2. The controlling system according to claim 1, wherein the second sensing unit is arranged to perform the second measurement inside the air handling system.

3. The controlling system according to claim 2, wherein the air cleaning unit is arranged to at least partly remove from the air flow a pollutant for which the second sensing unit is responsive.

4. The controlling system according to claim 1, wherein the second sensing unit is arranged to perform the second measurement inside the enclosure.

5. The controlling system according to claim 1, wherein the first sensing unit comprises a gas sensor.

6. The controlling system according to claim 1, wherein the second sensing unit comprises a particle sensor.

7. The controlling system according to claim 6, wherein the air cleaning unit comprises a particle filter, and wherein the particle sensor is an ultrafine particle sensor.

8. A vehicle comprising:
   a cabin;
   an air handling system comprises an air cleaning unit having an upstream side and a downstream side, the air cleaning unit arranged to pass an air flow into an enclosure positioned at the downstream side of the air cleaning unit, the air handling system arranged to operate in recirculation mode or in an outside-air-inlet mode; and
   a controlling system for controlling the air handling system, the controlling system comprises a first sensing unit and a controller, the first sensing unit arranged to generate a first output signal based on a first measurement performed in air at the upstream side of the air cleaning unit, the controller arranged to switch the air handling system into recirculation mode when the first output signal exceeds a predetermined threshold value, wherein the controlling system further comprises a second sensing unit that is arranged to generate a second output signal based on a second measurement preformed in air at the downstream side of the air cleaning unit, the controller being further arranged to fine-tune settings of the air handling system based on the second output signal.

9. The vehicle according to claim 8, wherein the enclosure is the cabin.

* * * * *